United States Patent [19]
Iino

[11] Patent Number: 5,510,983
[45] Date of Patent: Apr. 23, 1996

[54] ON-VEHICLE DISPLAY

[75] Inventor: Tadashi Iino, Shizuoka, Japan

[73] Assignee: Yazaki Corporation, Tokyo, Japan

[21] Appl. No.: 151,118

[22] Filed: Nov. 12, 1993

[30] Foreign Application Priority Data

Nov. 13, 1992 [JP] Japan .................. 4-303654

[51] Int. Cl.[6] ......................... B60Q 1/54
[52] U.S. Cl. .............. 364/424.01; 340/441; 345/7
[58] Field of Search ................. 340/441, 980; 345/7; 359/630; 364/424.01, 565

[56] References Cited

U.S. PATENT DOCUMENTS

| | | | |
|---|---|---|---|
| 1,871,877 | 8/1932 | Buckman | 359/630 |
| 2,641,159 | 6/1953 | Mihalakis | 359/630 X |
| 3,230,819 | 1/1966 | Noxon | 340/980 X |
| 3,274,545 | 9/1966 | Bowles et al. | 345/7 |
| 3,291,906 | 12/1966 | Ward et al. | 359/630 X |
| 4,190,832 | 2/1980 | Mohler | 345/7 |
| 4,925,272 | 5/1990 | Ohshima et al. | 345/7 X |
| 5,321,415 | 6/1994 | Mount | 345/7 |
| 5,386,216 | 1/1995 | Iino | 345/7 |

FOREIGN PATENT DOCUMENTS

4126148A1   2/1992   Germany .
60-192912   10/1985   Japan .

*Primary Examiner*—Edward R. Cosimano
*Attorney, Agent, or Firm*—Armstrong, Westerman, Hattori, McLeland & Naughton

[57] ABSTRACT

An on-vehicle display used in automotive vehicles for displaying an image projected from within a dashboard of a vehicle. A first reflecting surface on a windshield of a vehicle. The first reflecting surface is at a first angle with the dashboard. A second reflecting surface on a reflector is mounted in the proximity to a lower end portion of the windshield. The second reflecting surface is at a lower position than the first reflecting surface and at a second angle with the dashboard. A vehicle speed sensor for outputting a vehicle speed signal indicative of said vehicle speed to said controller. A controller guides the image projected from within the dashboard either to the first reflecting surface or to the second reflecting surface depending on a vehicle speed. A photodetector outputs a light intensity signal indicative of an intensity of ambient light in the proximity to the windshield. A controller receives the light intensity signal from the photodetector and guides the image projected from within the dashboard to the second reflecting surface when the light intensity signal is outside a predetermined range.

5 Claims, 5 Drawing Sheets

ON-VEHICLE DISPLAY

BACKGROUND OF THE INVENTION

1. Field of the Invention

The present invention relates to a display used for vehicles and more particularly to a display for indicating information such as vehicle speed to the driver, which information exists as a virtual image appearing at a distance from the driver's eyes.

2. Prior art

Many of conventional on-vehicle displays used for automotive vehicles are installed, for example, under the dashboard of the vehicle so that the displays are out of the driver's sight while the driver is driving the vehicle. While driving the vehicle, the driver's eyes move mostly in the horizontal direction since the driver is watching for oncoming traffic. However, the driver has to move his or her eyes vertically whenever the driver wishes to look at, for example, the speedometer under the dashboard. This is inconvenient particularly when the vehicle is running at relatively high speeds, and becomes increasingly inconvenient as the vehicle speed increases. One way of solving the aforementioned problem is to employ a head-up display where an image indicative of driving information is within the driver's sight while the driver is driving the vehicle. The image is viewed within the driver's sight but at a distance from the driver's eyes so that the driver needs to move his eyes only by small angles.

As shown in FIG. 6, Japanese Patent Preliminary Publication No. 60-192912 discloses an on-vehicle display for use in automotive vehicles. A projector 1 projects an image indicative of vehicle information, e.g., vehicle speed, onto a mirror 2b which in turn reflects the image to the inner surface of a windshield 3 through an opening 4a in a dashboard 4. The windshield 3 then reflects the light into the driver's eyes E1 so that the driver views a virtual image X1 at a distance behind the windshield 3. A motor 2a drives the mirror 2b to adjust inclination of the mirror 2 so that the position of the virtual image may be adjusted between position X1 and X2. However, not only the position of the virtual image is vertically moved only a little but also the image may often be out of the driver's eye range so that the driver must move his/her eyes to E2 to view the image X2. Therefore, the driver has to change his or her position in order to view the virtual images X1 and X2.

Sometimes, head-up displays are not advantageous, particularly on a fine day, in that small differences in intensity between the ambient light and the virtual image results in poor contrast of the virtual image. Moreover, the virtual image appears in the driver's sight when the vehicle is running at high speeds. This disturbs the driver's sight. The image tends to be reflected by both the outer surface and inner surface of the windshield 3 at night so that the display image may often be dual, resulting in poor display quality.

SUMMARY OF THE INVENTION

The present invention was made in view of the aforementioned deficiencies. An object of the present invention is to provide an on-vehicle display for use in automotive vehicles where the position of virtual image is shifted according to vehicle speed. Another object of the invention is to provide an on-vehicle display for use in automotive vehicles where the position of virtual image is shifted according to the intensity of light outside the vehicle.

A reflector is provided near a lower end of the windshield of the vehicle. The reflector or the windshield reflects a display image from a projector or a fluorescent display, which is located under the dashboard, into the driver's eyes. The driver views the display image as a virtual image either behind the mirror or behind the windshield. The virtual image is at higher positions when it is behind the windshield than when it is behind the reflector. The reflector is made of, for example, a dark, opaque material or a reflecting material applied with opaque printing thereon except the reflecting surface.

A controller controls the vertical position of the virtual image so that the virtual image is viewed at higher positions behind the windshield when the vehicle is running at higher speeds, and is viewed at lower positions behind the reflector when the vehicle is running at lower speeds. In addition, the controller controls the position of the virtual image so that the virtual image is viewed at lower positions behind the reflector when the intensity of ambient light is outside a predetermined range, i.e., during the daytime on a very fine day or during the night, in which case, the virtual image may be viewed at lower positions behind the reflector irrespective of the vehicle speed.

BRIEF DESCRIPTION OF THE DRAWINGS

Features and other objects of the invention will become more apparent from the description of the preferred embodiments with reference to the accompanying drawings in which.

DETAILED DESCRIPTION OF THE PREFERRED EMBODIMENTS

Construction

Figure 4:
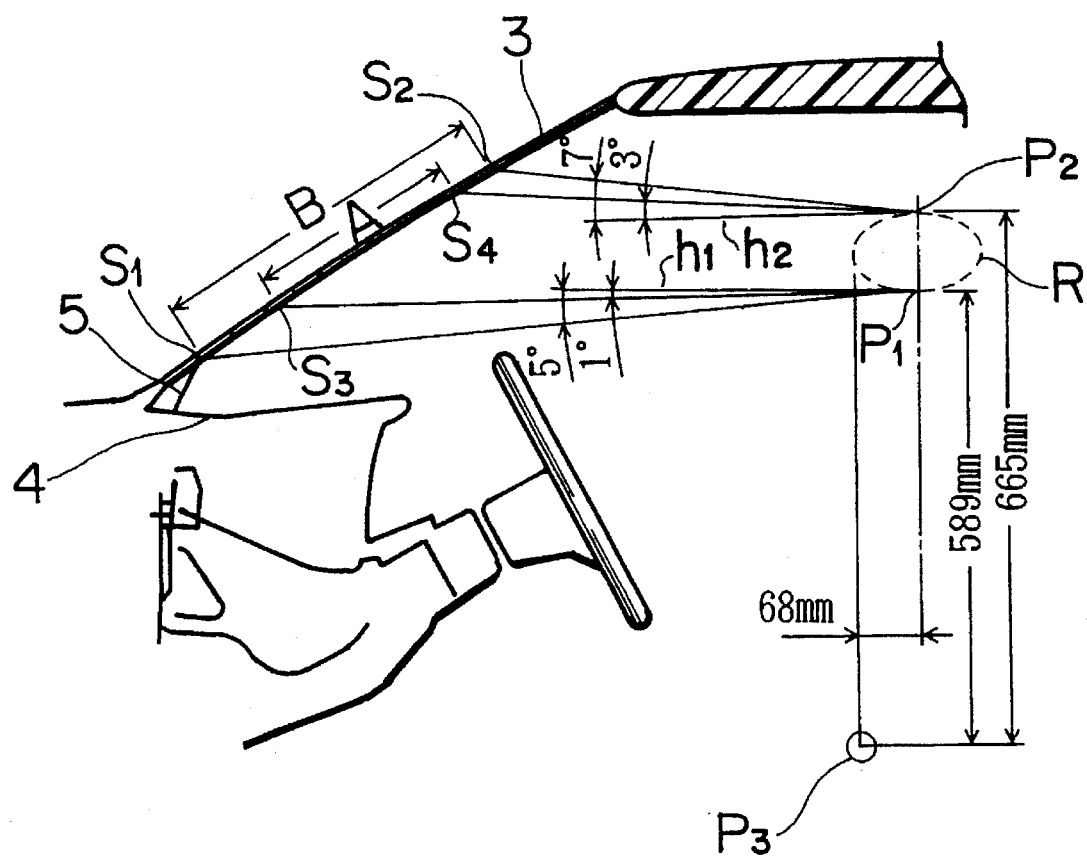
FIG. 4 illustrates the visibility of the driver while the driver is driving the vehicle.

In FIG. 4, a horizontal line h1 passes through point P1 in the eye range of a driver and a horizontal line h2 passes through point P2. Position S1 is where a line at a depression angle of five degrees with the horizontal line h1 intersects the windshield 3. Position S2 is where a line at an elevation angle of seven degrees with the horizontal line h2 intersects the windshield 3. Region B bounded by positions S1 and S2 must be cleared from any obstructions so that the driver is able to drive the vehicle safely.

Position S3 is where a line at a depression angle of one degree with the horizontal line h1 intersects the windshield 3. Position S4 is where a line at an elevation angle of three degrees with the horizontal line h2 intersects the windshield 3. Japanese Industrial Standards require that no display image is reflected by region A bounded by positions S3 and S4.

Figure 1:
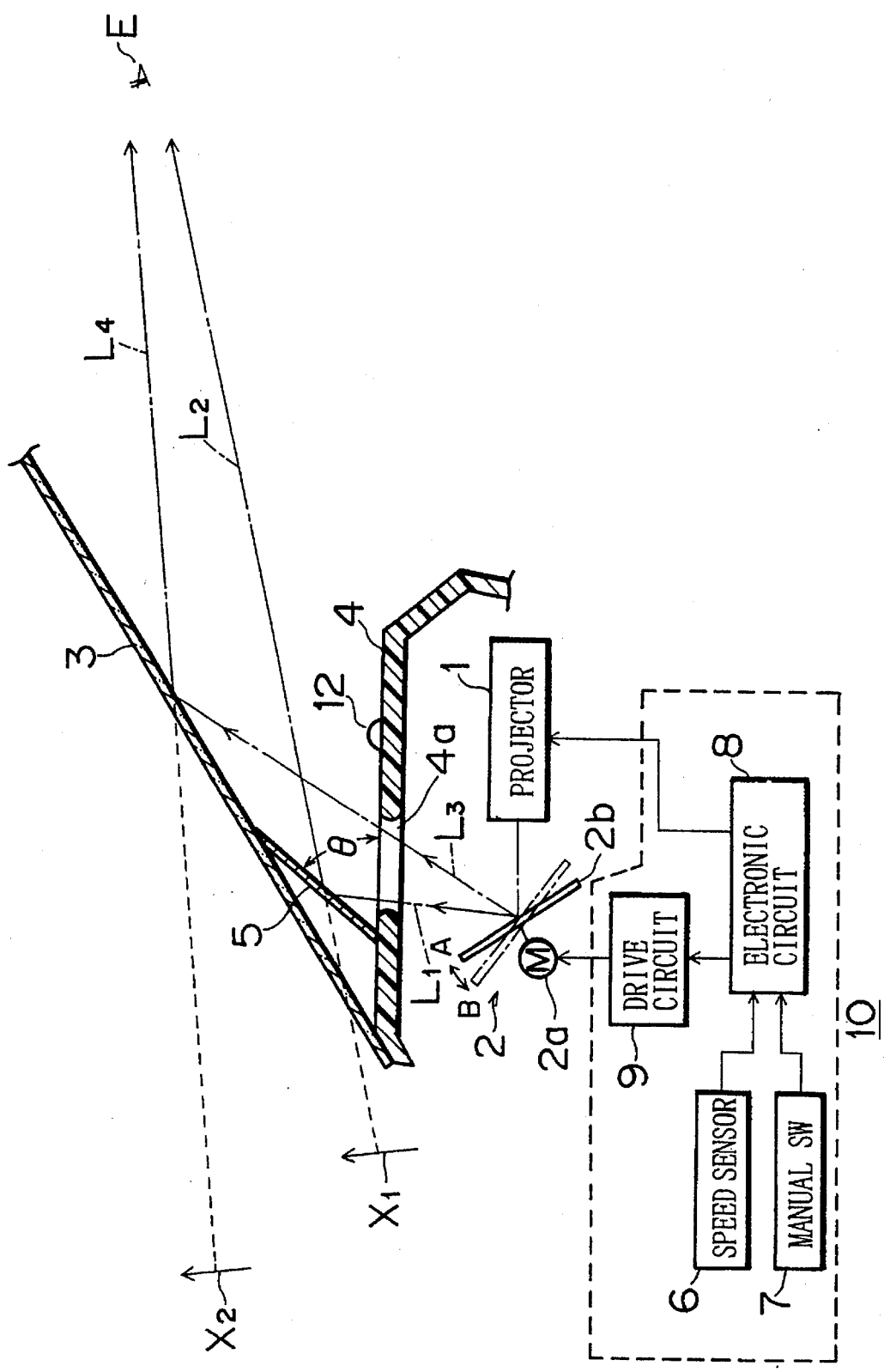
FIG. 1 illustrates an embodiment of an on-vehicle display according to the present invention.

The invention will be described in detail with reference to the drawings. FIG. 1 shows an embodiment of a head-up type display for use in automotive vehicles according to the invention. There are provided a projector 1, rotatable mirror 2, and controller 10, all of which are located under a dashboard 4. The controller 10 includes a manual switch 7, speed sensor 6 that outputs a vehicle speed signal, electronic circuit 8 having a CPU, and a drive circuit 9 that drives the motor 2a in accordance with the output of the electronic circuit 8. The rotatable mirror 2 includes a motor 2a and a mirror 2b. The manual switch 7 includes, for example, two switches; one is an up switch and the other is a down switch (not shown.) A continuous press of the up switch causes the motor 2a to drive the mirror 2b so that the virtual image appears at higher positions. A continuous press of the down switch causes the motor 2a to drive the mirror 2b so that the virtual image appears at lower positions.

The projector 1 projects a display image indicative of vehicle information, such as vehicle speed, onto the mirror 2b. The mirror 2b reflects the display image from the projector 1 through an opening 4a either to the reflector 5 or to the windshield 3. The electronic circuit 8 receives the vehicle speed signal from the speed sensor 6 and controls the drive circuit 9 in order to tilt the mirror 2b in accordance with the vehicle speed signal. The electronic circuit 8 also provides a signal representative of vehicle speed to the projector 1. Tilting the mirror 2b causes the light incident thereto to be reflected at different incident angles and reflection angles.

When the mirror 2b is at position B in FIG. 1, the mirror 2b reflects the display image L1, projected by the projector 1 to the reflector 5, through the opening 4a in the dashboard 4. The light L1 is then reflected as a light L2 into the driver's eyes E. The driver sees a virtual image X1 at a low position behind the reflector 5.

When the mirror 2b is at position A in FIG. 1, the mirror 2b reflects the display image L3, projected by the projector 1 to the windshield 3, through the opening 4a in the dashboard 4. The light L3 is then reflected as a light L4 by the inner surface of the windshield 3, and enters the driver's eyes E. The driver sees a virtual image X2 at a higher position behind the windshield 3. The virtual image X2 is slightly more distant from the driver's eyes E than virtual image X1. The driver is able to see both images X1 and X2 while sitting at the same position.

The driver views the virtual image X1 at lower positions when the vehicle speed is below a predetermined value, and the virtual image X2 at higher positions when the vehicle speed is over the predetermined value. The reflector 5 is provided at a predetermined angle θ with respect to the dashboard 4 near a lower portion of the windshield 3. The reflector may be made of a dark, opaque material or a reflecting material with opaque printing applied thereon except the reflecting surface.

The controller 10 may be designed to gradually vary the position of virtual image behind the reflector 5 or windshield 3 so that the virtual image is at lower positions when the vehicle is running at lower speeds and at higher positions when the vehicle is running at higher speeds.

Alternatively, the motor 2a can be manually operated, whereby shifting the manual switch 7 causes the motor 2a to be manually controlled to drive the mirror 2, thereby allowing the driver to show the virtual image at a desired position. On the other hand, position of the display image may be stored in a memory in the electronic circuit 8 so that the display image may automatically appear at the predetermined position whenever the display apparatus is turned on. The head up display according to the invention is designed so that the display image will never appear bridging between the windshield and the reflector 5.

Figure 3:
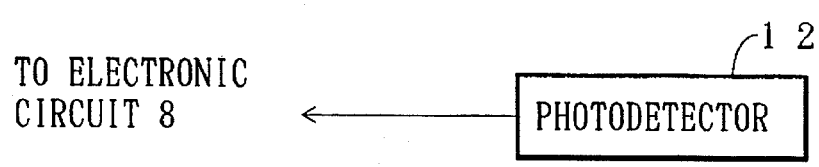
FIG. 3 illustrates a photodetector used in the present invention for detecting the intensity of ambient light.
Figure 6:
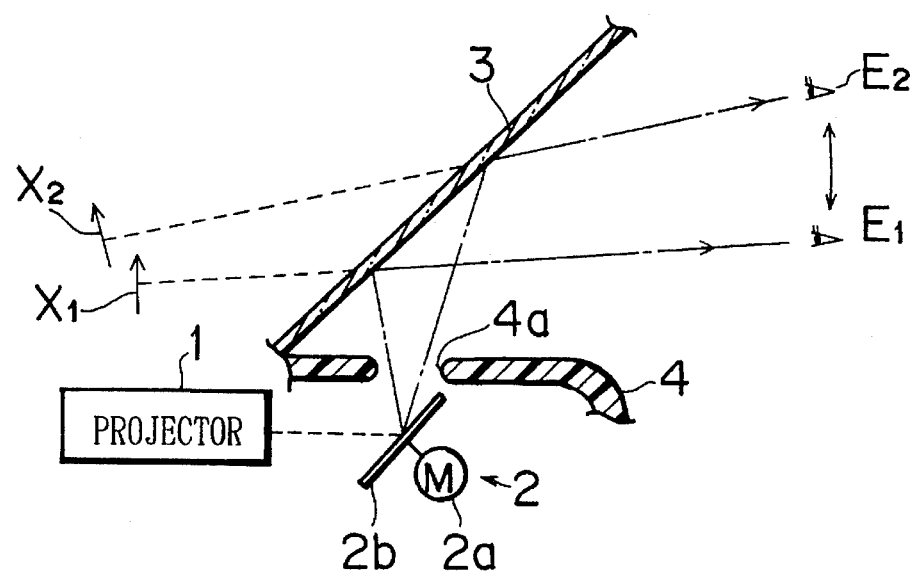
FIG. 6 illustrates a prior art on-vehicle display.

A photodetector 12, as shown in FIG. 3, may be provided on the dashboard 4, as shown in FIG. 1, where ambient light enters through the windshield 3 and provides a light intensity signal indicative of the intensity of ambient light to the electronic circuit 8. The electronic circuit 8 examines the light intensity signal to determine whether the brightness outside the vehicle is within or outside a predetermined range. If the brightness is outside the predetermined range, i.e., during the night when it is very dark or during the daytime when it is very bright, the virtual image is formed behind the reflector 5 irrespective of the vehicle speed. Forming a virtual image behind the reflector rather than behind the windshield eliminates the tendency of dual images due to reflection by the outer and inner surfaces of the windshield at night.

Figure 2:
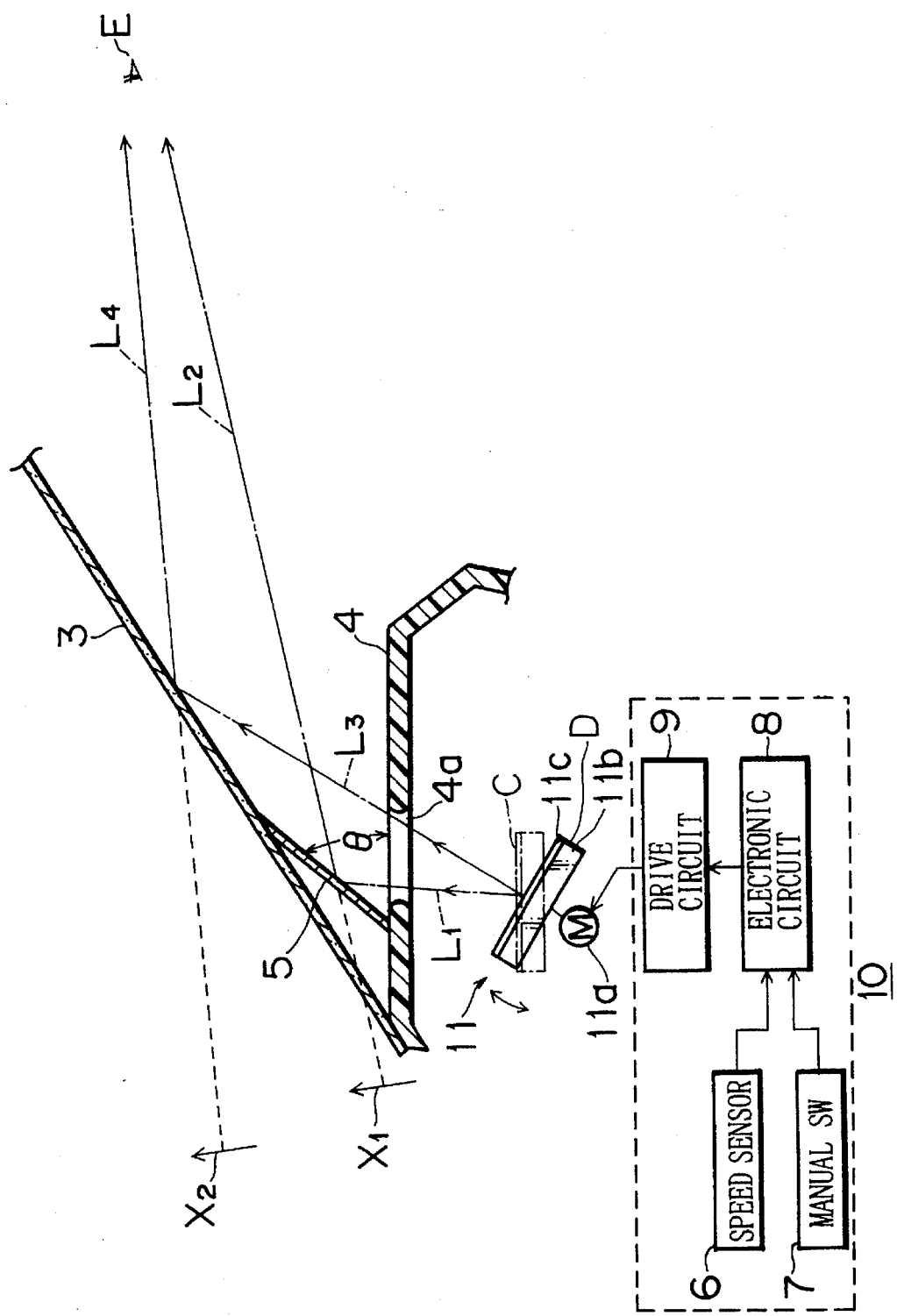
FIG. 2 illustrates another embodiment of the invention.

FIG. 2 shows another embodiment of an on-vehicle display apparatus according to the invention. The on-vehicle display is the same as that in FIG. 1 except that the projector 1, the mirror 2a, and the motor 2b are replaced by a fluorescent image display 1I. Elements similar to those in FIG. 1 have been given the same reference numerals. In FIG. 2, a drive circuit 9 controls a motor 11a to drive a fluorescent image display 11, so that a light emitting surface 1lb is tilted with respect to the windshield 3. The image projected from the light emitting surface 11b is in the form a divergent bundle of rays which are reflected not only by the reflector 5 but also by the windshield 3. Thus, the light emitting surface 11b has placed thereon a light control film 11c, which gives a predetermined direction to the rays. The image projected from the light emitting surface 11b is reflected by the inner surface of the windshield 3 behind which a virtual image X2 is formed at relatively high positions, or is reflected by the reflector 5 behind which a virtual image X1 is formed at relatively low positions. Of course, the light emitted from the display 11 may be reflected by a mirror (not shown) which, in turn, reflects the light to the windshield or the reflector 5. The photodetector 12 in FIG. 3 may also be used in the embodiment shown in FIG. 2.

The embodiment in FIG. 2 operates in a similar manner to that in FIG. 1. When the display 11 is at position C, the driver sees the image X1. When the display 11 is at position D, the driver sees the image X2.

In the embodiments in FIGS. 1 and 2 and with reference to FIG. 4, the reflector 5 is mounted at an area lower than point S1 at an angle θ with the dashboard 4. The inclination of mirror 2 is controlled so that the display image is reflected either by the inner surface of the windshield in the area between points S1 and S3 in FIG. 4 or by the reflector 5 according to the vehicle speed and ambient light intensity. Thus, the displayed image will not disturb the driver's visibility during driving.

Figure 5:
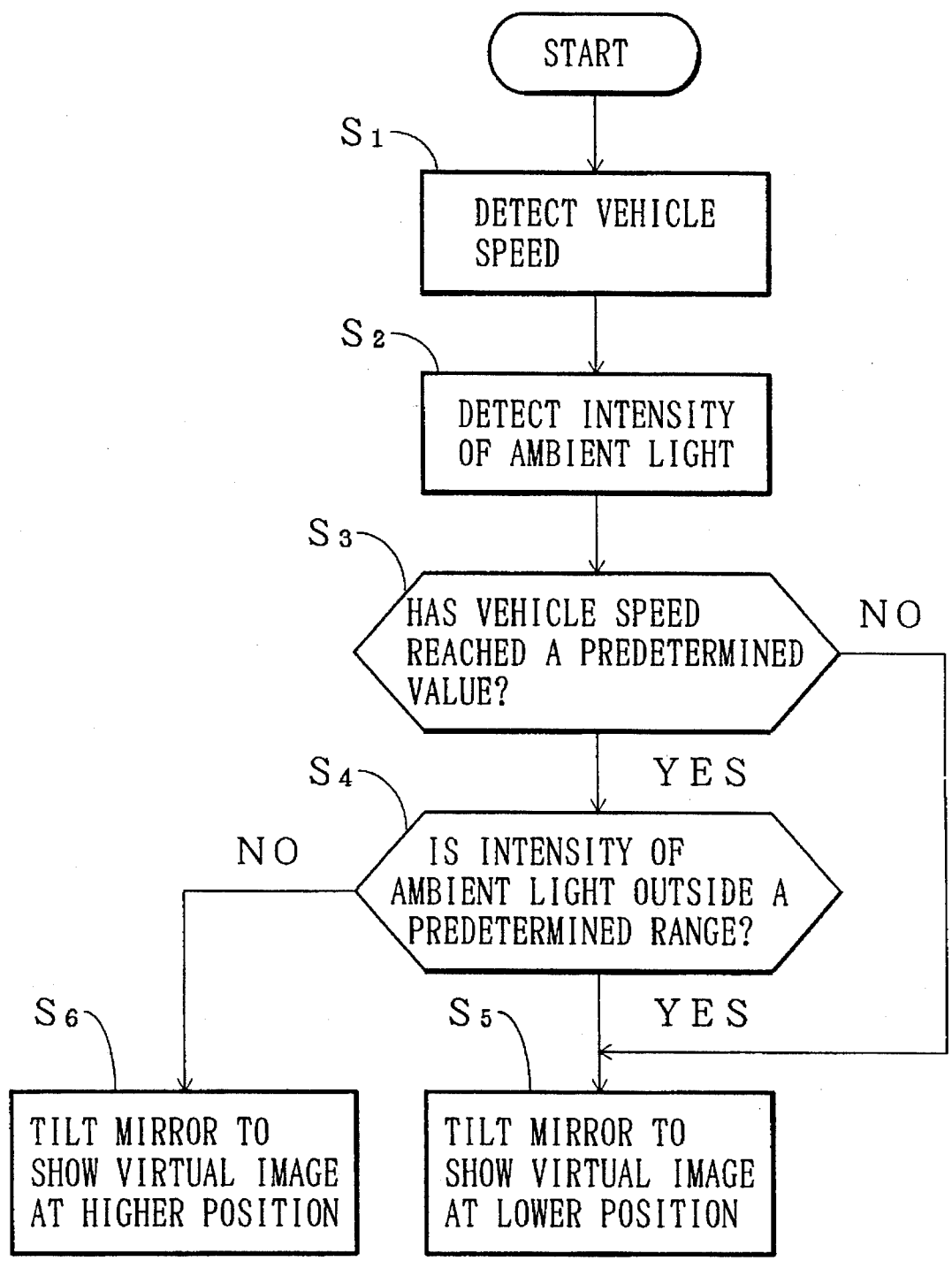
FIG. 5 is a flowchart showing the sequence for controlling the position of virtual image.

The operation of the controller 10 in FIG. 1 will be described with reference to the flowchart in FIG. 5. It is assumed that the on-vehicle display apparatus includes the photodetector 12. The program in FIG. 5 starts when the driver turns on the engine. At step S1, a random access memory (referred to as RAM hereinafter) in an electronic circuit 8 stores the vehicle speed signal outputted from the vehicle speed sensor 6. At step S2, the RAM also stores the light intensity signal indicative of the intensity of ambient light outside the vehicle. At step S3, the vehicle speed signal is read from the RAM and is compared with a predetermined threshold value. If the answer is NO at step S3, the program proceeds to step S5. If the answer is YES at step S3, then the program proceeds to step 54 where the light intensity signal is read from the RAM and a check is made to determine whether the light intensity is outside a predetermined range. If the answer is YES at step S4, the program proceeds to step S5 where the controller 10 controls the motor 2a to drive the mirror 2b to tilt so that the virtual image X1 is formed at a lower position. If the answer is NO at step S4, the program proceeds to step S6 where the controller 10 controls the motor 2a to drive the mirror 2b to tilt so that the virtual image X2 is formed at a higher position somewhat closer to the driver than the virtual image X1. The virtual images X1 and X2 are about 0–10 millimeters away from each other relative to the driver's eyes depending on their positions.

At steps S1 and S2, the vehicle speed and ambient light intensity outside the vehicle are actually periodically measured. The position of the mirror is adjusted each time the vehicle speed and ambient light intensity are measured, so that the position of the virtual image is updated periodically at step S4, the drive circuit 9 examines the light intensity signal from the light sensor 12 to determine whether it is the daytime on a very fine day, or it is a night when the intensity of ambient light is nearly zero. When the light intensity signal is of a value in the range from nearly zero to a predetermined value, the controller 10 drives the mirror 2b in accordance with the vehicle signal so as to form the virtual image at high positions or low positions correspondingly. On the other hand, the virtual image is at lower positions even though the vehicle is running at high speeds, if the light intensity signal is not in the range from nearly zero to the predetermined value.

The opening 4a in the dashboard 4 may be closed with a transparent glass plate or a transparent resin board to protect from dust.

What is claimed is:

1. An on-vehicle display for displaying an image projected from within a dashboard of a vehicle, comprising:

a windshield;

a first reflecting surface defined by a lower end portion of the inner surface of the windshield, said first reflecting surface being operative to reflect an image projected from within the dashboard into a driver's eyes when the image falls on said first reflecting surface; and a second reflecting surface being fixed with respect to said windshield at a position lower than said first reflecting surface, said second reflecting surface being angularly displaced with respect to said first reflecting surface and being operative to reflect an image projected from within the dashboard into the driver's eyes when the image falls on said second reflecting surface;

angularly adjustable image projecting means for projecting an image onto said first reflecting surface or said second reflecting surface, a light sensor; and a controller operative during a predetermined set of light conditions, as determined by said light sensor, to vary the disposition of said image projecting means to direct said image to various positions on said first reflecting surface when said vehicle operates over a higher range of speeds and to direct said image to various positions on said second reflecting surface when said vehicle operates over a range of speeds lower than said higher range of speeds;

said controller including means operated in response to said light sensor to restrict the disposition of said image projecting means to direct said image to various positions on said second reflecting surface over the entire range of vehicle speeds when said light conditions are outside of said predetermined set of conditions;

wherein the driver views a virtual image of the image projected from within the dashboard behind said first reflecting surface or said second reflecting surface.

2. An on-vehicle display according to claim 1, wherein said controller includes a vehicle speed sensor for outputting a vehicle speed signal indicative of said vehicle speed to said controller so that said controller guides the image projected from within the dashboard either to said first reflecting surface or to said second reflecting surface depending on a vehicle speed.

3. An on-vehicle display according to claim 2, wherein said controller controls movement of said image projecting means to guide the image projected from within the dashboard either to said first reflecting surface under a first vehicle operating condition in which the vehicle speed signal is higher than a predetermined value, and to said second reflecting surface under a second vehicle operating condition in which the vehicle speed signal is equal to or lower than the predetermined value.

4. An on-vehicle display according to claim 3 in which said light sensor comprises a photodetector for outputting a light intensity signal indicative of an intensity of ambient light coming into the vehicle through the windshield, and said controller receives the light intensity signal from said photodetector and controls the movement of said image projecting means to project the image projected from within the dashboard to said first and second reflecting surfaces when the light intensity signal is within a predetermined range and to only said second reflecting surface when the light intensity signal is outside said predetermined range.

5. An on-vehicle display according to claim any one of claims 1, 3 and 4 further including a manual switch for manually causing said controller to control the movement of said image projecting means to project the image either onto said first reflecting surface or onto said second reflecting surface.

* * * * *